Sept. 13, 1966  E. G. RODKEY  3,272,424
FLEXIBLE CONTAINER

Filed Jan. 11, 1965  2 Sheets-Sheet 1

INVENTOR
EDWARD G. RODKEY
BY Jerome Rudy
ATTORNEY

Sept. 13, 1966    E. G. RODKEY    3,272,424
FLEXIBLE CONTAINER

Filed Jan. 11, 1965    2 Sheets-Sheet 2

INVENTOR
EDWARD G. RODKEY
BY Jerome Rudy
ATTORNEY 3,272,424
FLEXIBLE CONTAINER
Edward G. Rodkey, Fresno, Calif., assignor to The Dow Chemical Company, Midland, Mich., a corporation of Delaware
Filed Jan. 11, 1965, Ser. No. 424,573
5 Claims. (Cl. 229—66)

This invention relates to a flexible container and, more particularly, to a flexible container having a protected easy-opening device.

Flexible containers or pouches made from superimposed plastic webs are frequently employed in the packaging of pulverulent materials and foods or in the packaging of semi-solid, viscous compositions which do not require a vacuum sealed container. In order to provide a ready opening means for such a container, the container may be notched at two opposing edges of the container and provided with a perforated tear line in one or both of the webs between the two notches. The disadvantage of such a container construction is that container contents may sift or flow out of the package at the perforatitons, thereby resulting in a loss of container contents as well as destroying the neat and clean appearance of the package.

It is therefore one of the objects of the present invention to provide a novel container construction for containers involving a perforated tear line. It is another object of this invention to provide a container construction which will prevent sifting or leaking of container contents in containers incorporating a perforated tear line opening device. Other objects will become apparent from the following description.

The objects of the present invention are accomplished by a generally flat, rectangular container formed from two superimposed flexible sheets wherein each sheet contains at least one heat sealable thermoplastic resin surface, said resin surface forming the inner wall of said container, said container having at least two opposing fin-type edge seals, a perforated tear line in at least one of the said sheets extending to opposite fin-type edge seals, said edge seals being preferably notched at the points of contact of said tear line with said edge seals, at least two partially superimposed thermoplastic resin tapes parallel to and covering said tear line, each of said tapes being sealed to the inner wall of said container in a line parallel to said tear line at the non-overlapping edges of said tapes, on either side of the tear line, said tapes also being sealed to the said fin-type edge seals, at least one of said tapes containing partial transverse slits adjacent to said edge seals. In a preferred embodiment of the described container construction, the tear line extends across each of the two webs between the notches in the fin-type edge seal and each of the thermoplastic resin tapes covering the tear line contains the said transverse slits.

Reference is now made to the drawing for a more detailed description of the invention in which.

Figure 1:
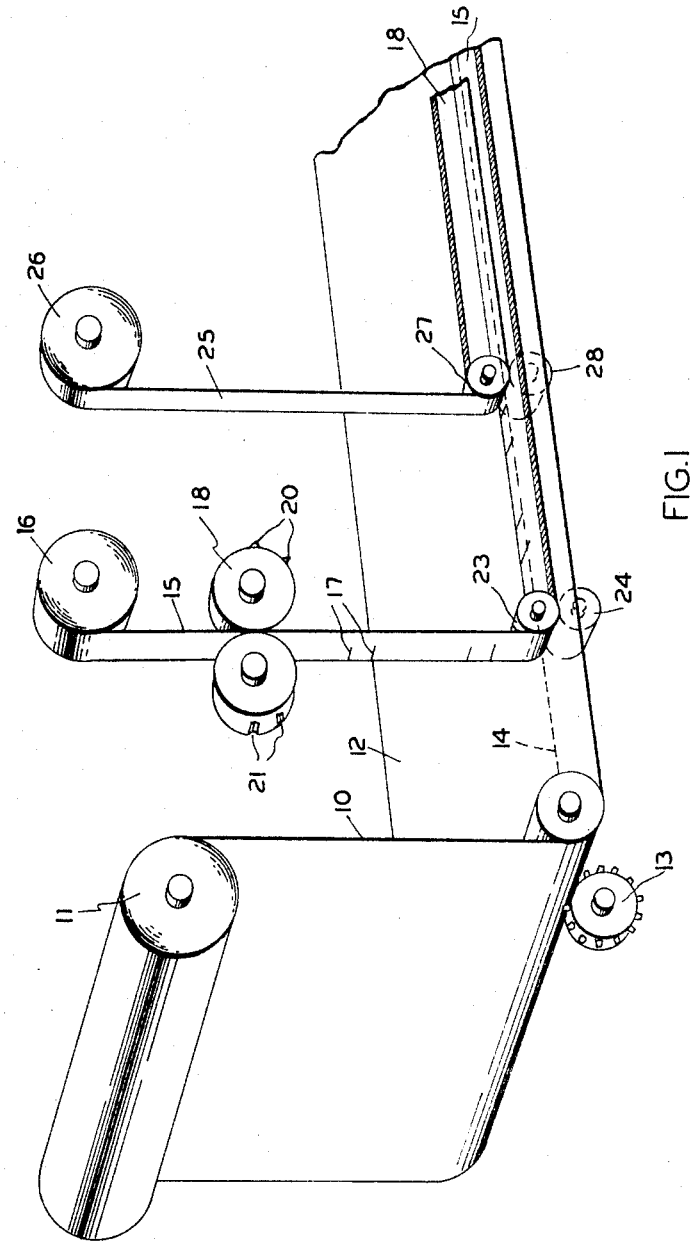
FIGURE 1 is a schematic illustration of the manner in which the overlapping thermoplastic resin tapes employed to prevent loss of container contents are applied to the flexible web from which the container is produced.

Referring now to FIGURE 1, a web 10 from roll stock 11 having a heat-sealable thermoplastic resin surface 12 is contacted with perforating wheel 13 which causes a perforated tear line 14 to be formed in the web 10. The nature of the perforation introduced is not critical and may be in any shape (i.e., a continuous row of round holes or square holes, although it is in general preferred to use the slits). The length of the slit and its frequency may be varied although the slits should not be too long to result in separation of the web on each side of the slit, nor should the slits be spaced so far apart as to interfere in the easy opening of the package. The web is then contacted with a heat-sealable thermoplastic resin tape 15 from spool 16 in a manner such that it covers the perforated tear line 14. The width of the tape 15 is not critical but should be sufficiently wide enough to cover the perforated tear line 14. For most packages thermoplastic resin tapes, 0.5 to 1 inch wide, placed on center with the tear line are satisfactory. Transverse slits 17 are cut into tape 15 by means of rolls 18 and 19 containing knife edges 20 in roll 18 and meshing grooves 21 in roll 19. Tape 15 is partially sealed to the web 10 by means of rolls 23, a section of which is heated either by inserted cartridge heaters, hot air, or radiant heat, not shown, and roll 24. Tape 25 from spool 26 is then contacted with the web by means of rolls 27 and 28 again covering the perforated tear line 14 and partially superimposed on tape 15. Roll 27, a section of which is heated in the manner of roll 24, seals tape 25 to web 10 on the opposite side of the tear line to which tape 15 was sealed. If desirable, a slitting step such as is illustrated with respect to tape 15 may also be employed for tape 25.

Figures 2, 3:
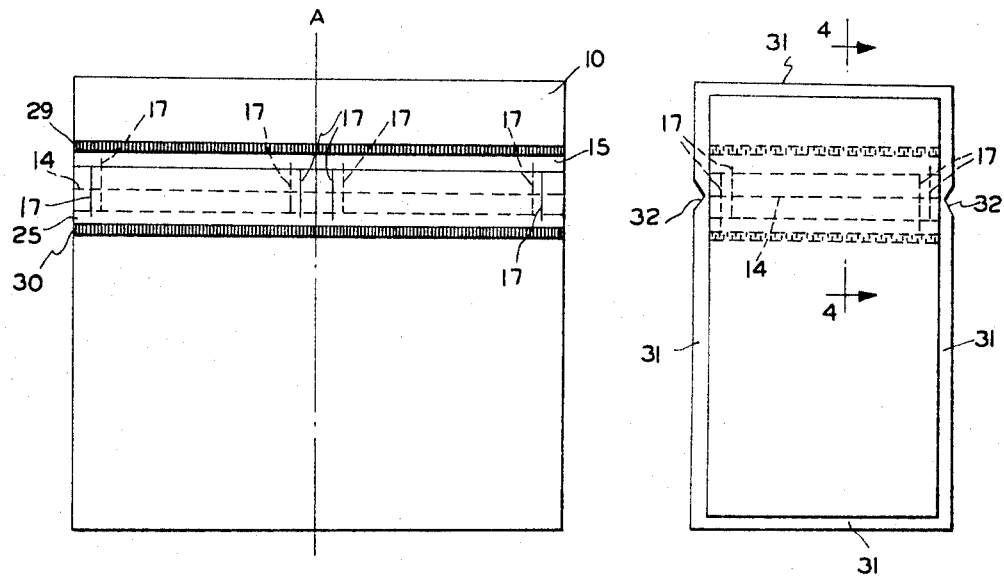
FIGURE 2 is a plan view of the web to which the heat-sealable thermoplastic resin tapes have been applied.
FIGURE 3 is a plan view of the container obtained on folding of the web in FIGURE 2 along line A, A'.

The web obtained by this method is more specifically illustrated in FIGURE 2 showing the web 10 with partially superimposed tapes 15 and 25, both covering tear line 14. The two tapes are sealed to the web at opposite sides of the tear line 14 by means of parallel seals 29 and 30. Transverse slits 17 have been punched in both tapes.

The flexible container shown in FIGURE 3 is obtained by folding the web of FIGURE 2 along line AA' and edge sealing all four edges of the folded web to obtain the fin-type seals 31. The resulting container is then notched with triangular notches 32 placed in line with the perforated tear line of the webs, to facilitate the opening of the package. Transverse cuts 17 aid in separating the tapes covering the tear line when opening the package from that part of the package to which the tape is not sealed by transverse seals 29 and 30.

Figure 4:
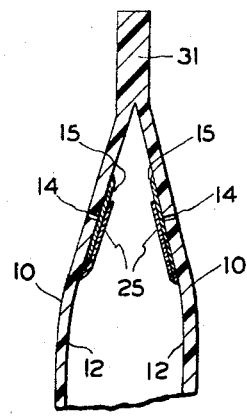
FIGURE 4 shows a partial cross-sectional view of the container of FIGURE 3 along line 4, 4'.

FIGURE 4 shows a partial cross-sectional view of the package of FIGURE 3 in which the folded web 10, having a heat-sealable thermoplastic resin surface 12 forms the edge seal 31 and contains the perforation 14. The perforation is covered by the thermoplastic resin tapes 15 and 25 along the entire length of the perforated tear line 14.

It will be apparent that various modifications may be made in the method of applying the superimposed thermoplastic resin tapes covering the perforated tear line. Thus, instead of applying only two tapes to cover the tear line, more than two tapes may be employed, each partially superimposed over the underlying tape and sealed to the web at the opposite side of that to which the underlying type is sealed. Similarly, the actual assembly and construction of the rectangular pouch-type container may be varied. Instead of folding the web as indicated in FIGURES 2 and 3, the container may be formed from two superimposed webs of the type illustrated in FIGURE 2. Instead of having a tear line in both sides of the pouch, a single tear strip having a dual line of perforation on a single side of the container may be employed. In the event of the use of such a tear tape, based on a dual line of perforation, it will be apparent that the thermoplastic resin film tapes are superimposed on the tear tape so as to cover both perforated lines.

The web employed in the manufacture of the containers having the protected tear line opening device of the present invention can be formed of one or more polymeric substances such as a polyolefin, and particularly polyethylene or polypropylene, a polyvinyl halide, a polyvinylidene halide, and copolymers and interpolymers thereof, or may be formed by coating a substrate such as a cellophane, paper, foil, or polyester web with one of the aforesaid polymeric materials, on one or both of the surfaces of such webs. The heat-sealable thermoplastic resin tape employed to cover the tear line of the container is generally of the same composition as the heat-sealable thermoplastic resin surface of the web to which the tape is sealed. However, it also is feasible to employ a tape having a composition different from that of the surface to which the tape is sealed. The tape employed to cover the perforated tear line is generally a thin resin film which readily clings to the web by means of electrostatic charges on the surface of the web or the film, thereby resulting in additional sealing of the perforations.

Preferred materials employed in the construction of the described containers are polyolefin webs and polyolefin coated transparent webs on such materials as cellophane, saran, and polyester; of the polyolefins, polyethylene is preferred. The thermoplastic resin tapes employed in the construction of the containers of the present invention are also preferably polyolefins, and particularly polyethylene.

Although the present invention is described in terms of heat sealing, since such is preferably used, the various components of the container may also be sealed by the use of an appropriate adhesive. Other combinations and container constructions in which the present invention can be employed will be apparent to those skilled in the art.

The containers of the present invention offer the advantage of allowing the easy opening of the container by means of a perforated tear line which is readily applied to the webs forming the sides of the container. By using two partially superimposed thermoplastic resin tapes which cover the perforated tear line and are sealed to the wall of the container, as well as to the edges of the container, pulverulent and viscous liquid contents are prevented from escaping from the container. Despite the added protection given by the superimposed tapes, the easy opening feature of the perforated tear line is not interfered with.

It is to be understood that the foregoing description of the invention is not intended to limit the scope thereof except as defined in the appended claims.

What is claimed is:

1. A generally flat rectangular container formed from two superimposed flexible sheets wherein each sheet contains at least one heat-sealable thermoplastic resin surface, said resin surface forming the inner wall of said container, said container having at least two opposing fin-type edge seals, a perforated tear line in at least one of said sheets extending to opposite fin-type edge seals, said edge seals being notched at the points of contact of said tear line with said edge seal, at least two partially superimposed heat-sealable thermoplastic resin tapes parallel to and covering said tear line, each of said tapes being alternately sealed to the inner wall in a line parallel to but set off from said tear line at opposing sides of said tear line, said resin tapes also being sealed to the said fin-type edge seals at least one of said resin tapes containing partial transverse slits adjacent to said edge seals.

2. The container of claim 1 wherein the tear line extends between the said notches on both superimposed sheets.

3. The container of claim 2 wherein the heat-sealable thermoplastic resin of the surface forming the inner wall of the container is a polyolefin.

4. The container of claim 2 wherein the heat-sealable thermoplastic resin of the surface forming the inner wall of the container and the thermoplastic resin of the tape is a polyolefin.

5. The container of claim 2 wherein all thermoplastic resin tapes contain partial transverse slits adjacent to the edge seals.

References Cited by the Examiner

UNITED STATES PATENTS

| | | | |
|---|---|---|---|
| 2,062,001 | 11/1936 | Grenier | 150—3 |
| 2,163,041 | 6/1939 | Kahn | 220—82 |
| 2,838,225 | 6/1958 | Carnes et. al. | 229—62.5 |
| 2,956,723 | 10/1960 | Tritsch. | |
| 3,038,651 | 6/1962 | Cloudsley | 229—66 X |
| 3,051,209 | 8/1962 | Gonzalez | 150—9 |
| 3,102,570 | 9/1963 | Fairchilds | 150—3 |
| 3,105,417 | 10/1963 | Hammer | 93—35 |
| 3,140,815 | 7/1964 | Majesky | 229—66 |
| 3,147,674 | 9/1964 | Hoeppner | 93—35 |
| 3,170,619 | 2/1965 | Repko | 229—66 X |
| 3,179,327 | 4/1965 | Burton | 229—66 |

JOSEPH R. LECLAIR, *Primary Examiner.*

D. T. MOORHEAD, *Assistant Examiner.*